United States Patent [19]

Abthoff et al.

[11] Patent Number: 4,481,841

[45] Date of Patent: Nov. 13, 1984

[54] MULTIPLE ENGINE DRIVE ARRANGEMENT

[75] Inventors: Jörg Abthoff, Plüderhausen; Hans-Dieter Schuster, Schorndorf; Karlwalter Schmidt, Weinstadt, all of Fed. Rep. of Germany

[73] Assignee: Daimler-Benz Aktiengesellschaft, Fed. Rep. of Germany

[21] Appl. No.: 325,865

[22] Filed: Nov. 30, 1981

[30] Foreign Application Priority Data

Nov. 29, 1980 [DE] Fed. Rep. of Germany ....... 3045093

[51] Int. Cl.[3] ...................... F16H 37/06; F16D 41/04; F01B 21/04; B60K 1/00

[52] U.S. Cl. .................................. 74/661; 74/665 A; 74/665 C; 74/665 L; 192/48.92; 60/709; 60/716; 60/718; 180/69.6

[58] Field of Search ................ 74/661, 665 A, 665 B, 74/665 E, 665 F, 665 G, 665 C, 665 GA, 665 GE, 665 N, 665 L, 675; 192/48.92, 48.9; 60/706, 709, 711, 716, 718; 180/54 C

[56] References Cited

U.S. PATENT DOCUMENTS

| | | | |
|---|---|---|---|
| 766,552 | 8/1904 | Sturtevant et al. | 192/48.92 |
| 1,942,197 | 7/1931 | Blackstock | 192/48.92 |
| 2,971,402 | 2/1961 | Lovercheck | 192/48.92 |
| 3,748,927 | 7/1973 | Hertzog et al. | 74/675 |
| 4,191,070 | 3/1980 | McKinniss | 74/675 X |

FOREIGN PATENT DOCUMENTS

| | | | |
|---|---|---|---|
| 583355 | 8/1933 | Fed. Rep. of Germany | 192/48.92 |
| 608065 | 12/1934 | Fed. Rep. of Germany | 60/716 |
| V9538 | 11/1956 | Fed. Rep. of Germany | 74/661 |
| 1002855 | 2/1957 | Fed. Rep. of Germany | 74/661 |
| 1276491 | 4/1969 | Fed. Rep. of Germany | |
| 587967 | 4/1925 | France | 74/675 |
| 899237 | 3/1945 | France | 192/48.92 |
| 274332 | 9/1951 | Switzerland | 74/665 GA |
| 100013 | 7/1916 | United Kingdom | 60/718 |
| 154981 | 12/1920 | United Kingdom | |
| 177340 | 3/1922 | United Kingdom | |
| 213156 | 3/1924 | United Kingdom | |
| 193869 | 5/1924 | United Kingdom | |
| 290237 | 12/1927 | United Kingdom | 60/718 |
| 334339 | 9/1930 | United Kingdom | 192/48.92 |
| 1007193 | 10/1965 | United Kingdom | |
| 1061952 | 3/1967 | United Kingdom | |
| 1476248 | 6/1977 | United Kingdom | 74/675 |
| 2088482 | 6/1980 | United Kingdom | 74/661 |

*Primary Examiner*—Allan D. Herrmann
*Assistant Examiner*—Stephen B. Andrews
*Attorney, Agent, or Firm*—Craig & Burns

[57] ABSTRACT

A drive arrangement which includes a number of internal combustion engines which are adapted to be connected to a flow of working force through free wheeling or one way clutches and gears to a common output shaft. In addition to a flow of working force the individual internal combustion engines may be interconnected by another flow of a tractive force which is formed by gearing up gears and one way or free wheeling clutches. This flow of tractive force acts only in a direction of force flow which opposes the flow of the working force. The internal combustion engines may be mechanically arranged in parallel next to one another or in series behind one another with working or output shafts of the internal combustion engines being located parallel or in series one behind the other. The working shafts are connected with parallel gear stages which transmit at different ratios and have opposing force flows. Only one gear stage acts at a time in any direction of force flow due to an alternating arrangement of the one way or free wheeling clutches.

13 Claims, 1 Drawing Figure

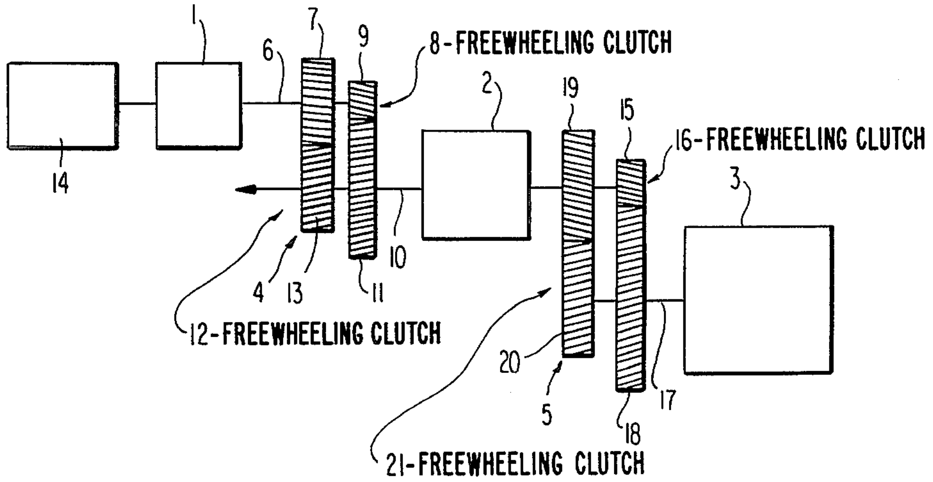
1
7
9
8-FREEWHEELING CLUTCH
6
2
19
15
16-FREEWHEELING CLUTCH
3
14
10
4
13
11
12-FREEWHEELING CLUTCH
20
17
5
18
21-FREEWHEELING CLUTCH

MULTIPLE ENGINE DRIVE ARRANGEMENT

The present invention relates to a drive arrangement and, more particularly, to a multiple engine drive arrangement which includes at least three internal combustion engines adapted to be connected through free wheeling clutches and gear means to a common output shaft.

With a modern day traffic density, vehicles are driven on an average of less than one-quarter of their maximum load for approximately 80% of the operating time.

In, for example, German Pat. No. 1,276,491 it has been proposed to utilize a number of engines having different outputs into drive shifts, with the engines preferably operating at two different speeds and being optionally connected to a propeller shaft by way of a suitable clutch arrangement.

It has also been proposed to provide a common drive for rail operated vehicles which drive includes two internal combustion engines having the same crankshaft rotational speed but with different power outputs, with a one-way or free wheeling clutch being connected to a flow of force from each internal combustion engine to the vehicle in front of a common step down reversing gear arrangement. The rotational working direction of the two one-way or free wheeling clutches are such that one of the clutches transmits a power while the other clutch is free-wheeling.

A disadvantage of the above proposed arrangements resides in the fact that the internal combustion engine which is not operating comes to a halt and requires the non operating engine to be brought up to a predetermined rotational speed thereby requiring additional power.

It has also been proposed to provide mulitcylinder internal combustion engines with a means for shutting down one or more cylinders during certain operating loads of the engine. A disadvantage of this proposed construction resides in the fact that it is complicated and expensive to shut down individual cylinders. Additionally, with gasoline operated engines, there is also an additional consideration, namely that, at a partial load operation, an overpressure is created in the intake manifold due to a quantity regulation of the fuel and, consequently, this increases a load alternation work.

The aim underlying the present invention essentially resides in providing a multiple engine drive arrangement wherein an ignition switch-over between the respective engines may be accomplished in such a manner that lower mechanical and power flow losses may be achieved than in previously proposed constructions with two engines or with internal combustion engines being equipped with a means for shutting down individual cylinders.

In accordance with advantageous features of the present invention, the individual internal combustion engines may be interconnected by a further tractive forces means formed by stepped up gear means and one way or free wheeling clutches, with a flow of the tractive force acting only in a direction of the force flow which opposes the flow of the working force. With internal combustion engines which are mechanically arranged either in parallel to one another or in series, the working shafts of the internal combustion engines located next to or behind one another are connected with two parallel gear stages which are adapted to transmit different gear arrangements and have opposing force flows with only one gear stage acting at a given time in any direction of the force flow due to an alternating arrangement of the one way or free wheeling clutches.

By virtue of the multiple engine drive arrangement of the present invention wherein the individual internal combustion engines are interconnected by gears, when the multiple engine drive arrangement is under a partial load, only as many individual engines are operating or fired as are required for the necessary output power, with the other engines being carried or dragged along in a lower rotational speed than during a full load operation. Thus, a fraction of the output loss of the other engines is less proportional to a reduction in the rotational speed. If one of the internal combustion engines is dragged or carried along due, for example, to a shut off of the fuel or the ignition of the engine, the frictional moment of the engine varies insignificantly and it is only when the rotational speed is varied that there is a frictional power change i.e., a friction moment times the rotational speed. Even if the combustion chambers of the internal combustion engines which are non-operative are not vented, the load alteration output due to the lower rotational speed is barely noticable.

With a multiple engine drive arrangement such as proposed by the present invention, a reduction in friction losses during a partial load operation is possible and, with almost the same friction moment, a ratio between the effective output torque and friction moment is improved thereby making it possible to significantly reduce fuel consumption and emission pollutants with an overall engine at no load and partial load without loosing the required torque and engine output.

In order to reduce a dragging output, i.e., a lower rotational speed on a part of the internal combustion engine which is non-operative, in accordance with the present invention, at least two transmission means are provided between each of two internal combustion engines, with each of the transmissions being provided with one-way free wheeling clutches which are operative in respective directions so that the different transmissions do not block one another and each transmission may readily operate. By virtue of the provision of one way or free wheeling clutches, it is ensured that the rotational speed of the drag or non-operative internal combustion engine is, on the one hand, lower, and, on the other hand, when the non-operative internal combustion engine becomes operative it can readily be brought up to a rotational speed level of the already operating engine and may then immediately provide an appropriate power to the output shaft.

In accordance with further advantageous features of the present invention the internal combustion engines may be of different constructions with respect to both power output and rotational speed, and, of the two transmissions or gear stages each of which connect the adjacent internal combustion engines, one of the transmissions may be constructed having a gear ration of approximately 1:1 with the other of the transmission being constructed to sharply gear down in a direction of the internal combustion engine constructed for the lower working rotational speed.

In accordance with the present invention, the gear stages or transmissions may be constructed as a planetary gear arrangement so as to provide the advantage of a simple transfer of the energy at a 1:1 transmission ratio of the rotational speed. However, it is also possible to utilize spur gears and/or belt gears for transmitting a power between the respective engines.

Advantageously, in accordance with the present invention, secondary aggregates of the overall arrangement of the internal combustion engines can be located and driven by a single engine, with the secondary aggregates being located at the internal combustion engine having the highest rotational speed . By virtue of this arrangement, it is ensured that the aggregates connected to the shaft of the smallest internal combustion engine having the highest rotational speed can be run up to sufficient rotational speed when the overall multiple engine drive arrangement is in an idling condition, i.e., only the smallest combustion engine is in operation, and may turn only slightly faster than the next smallest engine brought into operation, i.e., the smallest internal combustion engine being dragged or carried along. The rotational speed range is smaller between the engines by a rotational speed jump from load to carrying transmission. This arrangement may be exploited in order to reduce an overall weight of the secondary aggregates.

Advantageously, in accordance with further features of the present invention, the one-way or free wheeling clutches of the gear stages or transmissions may, at least in part, be blocked, with the free wheeling clutch of the dragged or dragging transmission being locked by a positive clutch. Thus, the transmission may also be used as a load transmission for the next internal combustion engine which is to be put into operation. Due to a low rotational speed, friction losses of this engine will be lower than if the engine were run up to a same 1:1 rotational speed level. It is also possible in accordance with the present invention to provide at least three internal combustion engines each of which have different power outputs and, in this arrangement, the power output would take place through a medium powered engine.

The advantage of transmitting drag among or between the respective engines resides in the fact that, in contrast to a complete shut down state of the engines, the unfired or unoperating internal combustion engines continue to carry out their operating cycles and, when fuel is, for example, injected into the respective engines, the engines automatically run up to a load rotational speed without any external introduction of mechanical energy. Consequently, delays in load operation or jerking due to switching are minimal. Additionally, it is possible to select a drag rotational speed in such a manner that uncompensated mass forces of the operating or fired internal combustion engines are off set by those of the unoperated or dragged engines.

Accordingly, it is an object of the present invention to provide a multiple engine drive arrangement which avoids, by simple means, shortcomings and disadvantages encountered in the prior art.

Another object of the present invention resides in providing a multiple engine drive arrangement which minimizes the mechanical and power losses between the respective engines.

Yet another object of the present invention resides in providing a multiple engine drive arrangement which minimizes the friction losses of the drive arrangement.

A further object of the present invention resides in providing a multiple engine drive arrangement which functions reliably under all load conditions.

These and other objects, features, and advantages of the present invention will become more apparent from the following description when taken in connection with the accompanying drawing which shows, for the purposes of illustration only, one embodiment in accordance with the present invention, and wherein:

the single FIGURE is a schematic view of a multiple engine drive arrangement constructed in accordance with the present invention.

Referring now to the single figure of the drawing, according to this figure, a multiple engine drive arrangement includes at least three internal combustion engines 1, 2, 3 which may, for example, be gasoline operated engines, diesel engines, piston engines, Wankel engines, or any combination thereof, with the engines 1, 2, 3, having different power outputs and rotational speeds. The engines 1, 2, 3, are interconnected by gear arrangements generally designated by the reference numerals 4, 5. Both gear arrangements 4, 5 may, for example, be planetary gear systems, spur gear systems or belt gear systems, of conventional construction. Advantageously, the gear arrangements 4, 5 are constructed as planetary gear systems since such a construction provides a simple transfer of energy with a 1:1 ratio which prevails in multiple engine drive arrangements.

The gear arrangement 4 connects the internal combustion engines 1, 2 and may, for example, include a spur gear 7 mounted on a crankshaft 6 for rotation therewith. A pinion gear 9 is mounted on the crankshaft 6 by a free wheeling or one way clutch generally designated by the reference numeral 8, with the gear 9 being adapted to drive, by an appropriate gear down arrangement, a spur gear 11 connected to a crankshaft 10 of the engine 2. The crankshaft 10 forms an output or drive shaft of the multiple engine drive arrangement. A further spur gear 13 is mounted on the crankshaft 10 by a one way or free wheeling clutch generally designated by the reference numeral 12, with the gear 13 meshing with the gear 7 on the crankshaft 6. The one way freewheeling clutches 8 and 12 are constructed and arranged in such a manner that they do not block one another. Advantageously, the engine capacities are graduated in such a manner that the smallest internal combustion engine 1 covers or operates in the smallest load range, while the larger engines 2, 3 are not fired or operated and are dragged at a significantly lower rotational speed. As to load requirement increases on the overall multiple engine drive arrangement, the next larger internal combustion engine 2 is fired or operated, with this engine assuming a task of generating the load to the output, dragging the load of the next engine, connected through the gear arrangement 5, as well as the load of the smallest engine 1 which is no longer fired together with the load of the secondary aggregates. Because of the provision of the free wheeling clutch 8, the engine 1 cannot be dragged by the engine 2 and the drop off of the rotational speed, down to the level of the crankshaft 10 as well as the drive is being carried out through the one way free wheeling clutch 12 and spur gear 13 at a 1:1 ratio. In this connection, the free wheelig clutch 12 locks in the load direction from the engine 2 to the engine 1 but runs freely in the opposite direction. The capacity of the engine 2 should be large enough so that it can cover a large portion of partial load range operations which are developed in the overall multiple engine drive arrangement. The engine 3 may only be fired when the load ranges exceed the capacity of the engine 2.

The gear arrangement 5 disposed between the engines 2, 3 may, for example, include a spur gear 19 mounted on the crankshaft 10 and a pinion gear 15 mounted on the crankshaft 10 by way of a one way or free wheeling clutch 16. A spur gear 18 is provided on the crankshaft 17 of the engine 3 with a further spur gear 20 being mounted to the crankshaft 17 by way of a free wheeling clutch generally designated by the reference numeral 21. The gear 5, from the crankshaft 10 through the pinion 15 and engageable free wheeling clutch 16, locks the engine 3 by means of the spur gear 18 rigidly connected to the crankshaft 17. The spur gear 19, rigidly connected to the crankshaft 10, meshes with the spur gear 20. The free wheeling clutch 21 is constructed in such a manner that when the internal combustion engine 3 is dragged the free wheeling clutch 21 does not lock. If the engine 3 puts out a load, initially the one way or free wheeling clutch 16 or free wheeling clutch lock causes the spur gear 18 to remain meshed with the pinion 19 until the internal combustion engine 3 is fully loaded. Then, the one way overrunning clutch lock in the one way clutch 16 is disengaged and the rotational speed of the engine 3 increases up to the level permitted by the spur gears 19 and 20 of the gear arrangement 5 in a load direction toward the engine 2. The spur gears 19, 20 rotate freely when the load shifts from the engine 2 to the engine 3. In accordance with the rotational speed increase when the working flows through the spur gears 19, 20, the engine 3 may provide an output having more torque and power to the crankshaft or output shaft 10.

If a maximum load is expected at the output shaft 10, then the engine 1 is again fired or rendered operative. The engageable free wheeling clutch 12 is locked in the spur gear 13 so that the power or output is to the output shaft 10 through the spur gears 7, 13. If the power required by the secondary aggregates 14 of the overall multiple drive arrangement required from the shaft 6 exceeds that which the engine 1 can provide with the spur gears 7, 13 effective engaged, then the one-way overrunning clutch lock of the overrunning clutch 13 is disengaged thereby making is possible for the engine 1 to increase the power output to the secondary aggregates 14. Thus, the output shaft 10 does not need to provide any power for the secondary aggregates 14. The power output for fully loaded secondary aggregates 14 may be prevented in the same manner if the engine 3 is not fired.

A multiple drive arrangement of internal combustion engines operates with restricted capabilities even with only two engines. Without the engine 1, the secondary aggregates 14 may be driven by the engine 2, with the secondary aggregates 14 then being rigidly connected to the crankshaft 10. However, without the engine 3, the consumption advantages may be obtained only in an idling operation.

Moreover, output can also be accomplished from the internal combustion engine 1; however, this would sacrifice the advantage of reduced weight because high torque gears would be required only between the engines 2 and 3 with the type of internal combustion engines which are envisioned by the present invention. The gear between the engines 2 and 3 needs only to transmit the power of the smallest internal combustion engine 1.

While a number of internal combustion engines in the multiple engine drive arrangement is theoretically unlimited, for an intermittent or transient operation an optimum arrangement may be attained with the three internal combustion engines 1, 2, 3 and there must be at least two gear arrangements 4, 5. With more gears there are more ways to adapt to load and rotational speeds with a pushing and a pulling. The use of more than two gears between the engines 2 and 3 would be advantageous in order to reduce jumping or the like between switching of the respective engines.

The advantages of the multiple engine drive arrangement areas follows.

With a multiple engine drive arrangement having the equivalent of a three meter gasoline engine having approximately 1.5 kW frictional output and a load changing capacity of approximately 1.5 KW at 700 rpm, if, in accordance with the present invention, the engine is divided into three engines the following are obtained.

Engine 1: 0.3 liter capacity, 1200 rpm, frictional power 0.26 kW and 0.3 kW for the secondary aggregates 14, and a load changing capacity of 0.26 kW.

Engine 2: 0.9 liter capacity, 400 rpm, 0.16 KW frictional power, and a load changing capacity of 0, i.e., the engine is ventilated.

Engine 3: 1.8 liter capacity, 133 rpm, 0.16 kW frictional power, load changing capacity 0, i.e., ventilated.

Total of losses 1.24 kW, i.e., the loss is decreased to approximately 41% of the normal engine. When the multiple engine drive arrangement is partially loaded, the losses drop to approximately 80% of those of a normal engine.

The said secondary aggregates or secondary sets should be understood as cooling air fan and electric generator for loading the battery at least; but also any compressor or vacuum pump for the brakes or a hydraulic pump for boosting the steering or any other power-demanding auxiliary equipment which is necessary or useful in operating an internal combustion engine or a vehicle driven by it may belong to said secondary aggregates.

While we have shown and described only one embodiment in accordance with the present invention, it is understood that the same is not limited thereto but is susceptible of numerous changes and modifications as known to one having ordinary skill in the art and we therefore do not wish to be limited to the details shown and described therein, but intend to cover all such modifications as are encompassed by the scope of the appended claims.

We claim:

1. A drive arrangement comprising at least two internal combustion engines and connecting means for connecting the internal combustion engines to each other in such a manner that both engines drive a common output shaft or each engine is individually operable, characterized in that the connecting means includes a force transmission means arranged between the engines, said force transmission means includes a plurality of gear means each operatively adapted to transmit at different transmission ratios and provide opposing force flows, each of the gear means includes a free wheeling clutch means connected to an output shaft of the respective engines, in that the respective free wheeling clutch means are arranged such that only one of the gear means acts at a given time in a direction of force transmission, and in that the plurality of gear means includes a first spur gear mounted on an output shaft of a first of the engines for rotation therewith, a second gear means mounted on the output shaft of the first engine by a free wheeling clutch means, a second spur gear meshing with the second gear means and mounted on an output shaft of a second engine for rotation therewith, and a further gear means meshing with the first spur gear and mounted on the output shaft of the second engine by another free wheeling clutch means.

2. A drive arrangement according to claim 1, characterized in that each of the engines are constructed so as to have a different power output and a different rotational speed.

3. A drive arrangement according to claim 2, characterized in that one of the gear means has a gear ratio of approximately 1:1 with another of the gear means having a sharply stepped down gear ratio compatible with the engine having a lower rotational speed.

4. A drive arrangement according to claim 3, characterized in that secondary aggregate means are provided, and in that the secondary aggregate means are driven only by one of the engines.

5. A drive arrangement according to claim 4, characterized in that the engine driving the secondary aggregate means is the engine having the highest rotational speed.

6. A drive arrangement according to claim 1, characterized in that a drive of the drive arrangement is effected by the engine having the intermediate power output.

7. A drive arrangement according to claim 1, characterized in that at least three internal combustion engines are provided, the engines respectively have a high, intermediate, and low power output, and in that a drive of the drive arrangement is effected by the engine having the intermediate power output.

8. A drive arrangement according to claim 1, characterized in that at least three internal combustion engines are provided, and in that gear means arranged between the second and third engines includes a third spur gear mounted on the output shaft of the second engine for rotation therewith, a fourth spur gear mounted on the output shaft of the second engine by a further free wheeling clutch means, a fifth spur gear meshing with the fourth spur gear and mounted on an output shaft of the third engine and a sixth spur gear mounted on the output shaft of the third engine by another free wheeling clutch means.

9. A drive arrangement comprising at least three internal combustion engines, the engines respectively have a high, intermediate, and low power output, and connecting means for connecting the internal combustion engines to each other in such a manner that both engines drive a common output shaft or each engine is individually operable, characterized in that the connecting means includes a force transmission means arranged between the engines, said force transmission means includes a plurality of gear means each operatively adapted to transmit at different transmission ratios and provide opposing force flows, each of the gear means includes a free wheeling clutch means connected to an output shaft of the respective engines, in that the respective free wheeling clutch means are arranged such that only one of the gear means acts at a given time in a direction of force transmission, and in that the plurality of gear means includes a first spur gear mounted on an output shaft of a first of the engines for rotation therewith, a second gear means mounted on the output shaft of the first engine by a free wheeling clutch means, a second spur gear meshing with the second gear means and mounted on an output shaft of a second engine for rotation therewith, and a further gear means meshing with the first spur gear and mounted on the output shaft of the second engine by another free wheeling clutch means.

10. A drive arrangement according to claim 9, characterized in that each of the engines are constructed so as to have a different power output and a different rotational speed.

11. A drive arrangement according to claim 10, characterized in that one of the gear means has a gear ratio of approximately 1:1 with another of the gear means having a sharply stepped down gear ratio compatible with the engine having a lower rotational speed.

12. A drive arrangement according to claim 11, characterized in that secondary aggregate means are provided, and in that the secondary aggregate means are driven only by one of the engines.

13. A drive arrangement according to claim 12, characterized in that the engine driving the secondary aggregate means is the engine having the highest rotational speed.

* * * * *